Jan. 31, 1933.  W. F. HEROLD  1,895,882
CASTER
Filed Oct. 29, 1930

INVENTOR.
WALTER F. HEROLD
BY
ATTORNEY

Patented Jan. 31, 1933

1,895,882

UNITED STATES PATENT OFFICE

WALTER F. HEROLD, OF BRIDGEPORT, CONNECTICUT, ASSIGNOR TO THE BASSICK COMPANY, OF BRIDGEPORT, CONNECTICUT, A CORPORATION OF CONNECTICUT

CASTER

Application filed October 29, 1930. Serial No. 491,872.

The present invention relates to improvements in casters, and has for an object to provide a caster particularly for angular sheet metal legs having inwardly extending base flanges, and of the type now generally employed on stoves, refrigerators, and the like. While these legs are of substantially right angular shape in cross section, their vertical contour is usually curved and rounded, and this curvature varies to a great extent in different designs. For this reason it has been very difficult in the past to attach a caster, both due to the curvature and to the variations of shape in different designs, and where casters have been used it has been necessary to design one to individually fit the particular size and shape of leg, and even in such cases it was found both difficult and impractical to attach these to the curved surfaces in a manner to properly and efficiently support the weight without undue strain and distortion. Also the methods of attachment heretofore in use required rivets and screws necessitating drilling of the leg.

It is proposed in the present invention to provide a caster which may be readily attached to angular metal legs of the type referred to, or to angular corner structures, without reference to the particular shape, size, or design, and to this end I propose in the present embodiment to provide an attaching means to which the caster horn is swiveled, and which is adapted to be secured to the inturned base flanges of the leg or corner structure, and which will be so disposed as to properly support the weight without strain upon the leg or corner structure. Another object is to provide such a caster which may be quickly and reliably attached without drilling for rivets or screws. Other objects are to provide a caster of relatively low and wide proportion, so that it will be inconspicuous and will harmoniously fit in with the general design of the leg or corner structure.

With the above and other objects in view embodiments of the invention are shown in the accompanying drawing, and these embodiments will be hereinafter more fully described with reference thereto, and the invention will be finally pointed out in the claims.

In the drawing:—

Figure 1:
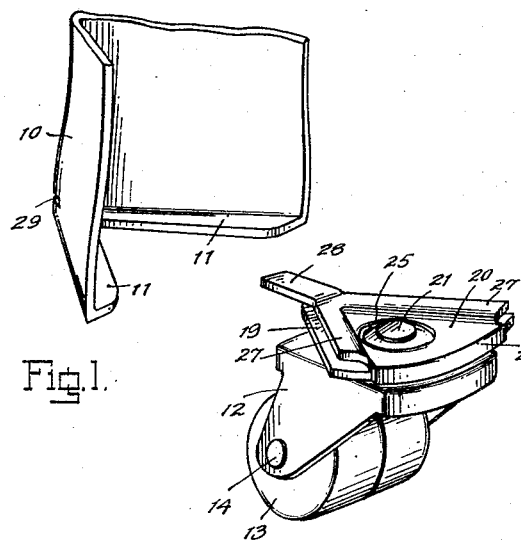
Fig. 1 is a perspective view, showing the lower end of an angular sheet metal leg, and a caster, according to one embodiment of the invention in position to be assembled with the leg.

Referring to the drawing, the caster, according to the present embodiment of my invention, is adapted to be secured to the lower end of an angular sheet metal leg 10 having laterally disposed inturned base flanges 11 forming a substantial V-shape. Obviously the caster may be attached to any angular corner structure having inturned flanges, and the invention contemplates such use.

The caster comprises a horn 12 of relatively wide and low proportions, preferably having a pair of wheels 13, 13 mounted on the axle 14, this arrangement giving substantial support with relatively low height.

A center stud 15 is rotatably engaged in the central aperture 16 of the horn top and has a shoulder 17 engaged at the under side of the horn top and a shoulder 18 spaced slightly above the upper side. A pair of plates 19 and 20 are secured upon the reduced extension of the stud between the shoulder 18 and the headed over upper end 21, thus rotatably connecting the horn to these plates.

A depressed ball bearing race 22 is provided in the horn top in which bearing balls 23 are disposed and which bear upon an annular shouldered bearing portion 24 of the plate 19. This shoulder is formed by dishing the plate 19 in surrounding relation to the stud receiving aperture, and the plate 20 is correspondingly dished, as at 25, so that it nests in the plate 19 and provides a recess for the head 21 of the stud.

The plate 19 is of generally triangular shape, substantially corresponding to the angle of the leg to which the caster is to be attached, the rear edge being preferably curved, and having a downwardly bent flange 26 at the rear edge of the plate 20 engaged over it. The plate 20 has the marginal portion of its two angular sides bent upwardly and outwardly to form a substantially V-shaped lip 27 spaced above the marginal portion of the plate 19, and forming therewith a V-shaped peripheral recess, adapted to snugly receive the flange 11, as will presently more fully appear.

For the purpose of snugly engaging with the flange, the lip is slightly diverging and resilient. The edge of the lip 27 is set back slightly from the edge of the plate 19, so that in engaging the leg the plate 19 will preferably engage the under surface of the flanges 11 to their outer edges. At the point of the lip 27 there is provided a forwardly projecting retaining tongue 28 slightly offset upwardly.

Figure 2:
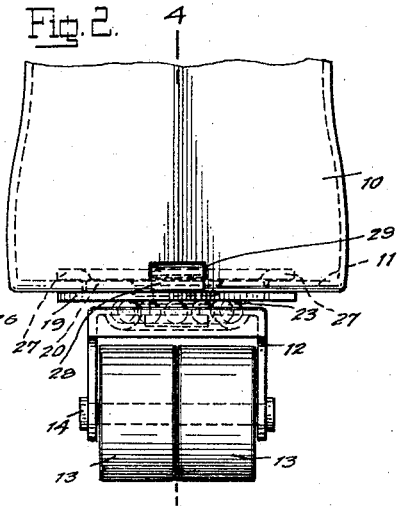
Fig. 2 is a front elevation of the same, and showing the caster attached to the leg.
Figure 3:
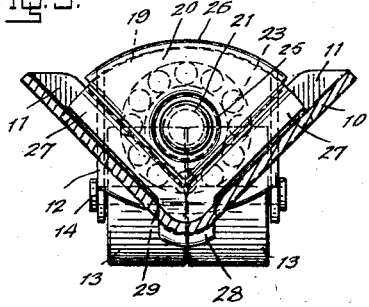
Fig. 3 is a plan view, the leg being shown in horizontal section.
Figure 4:
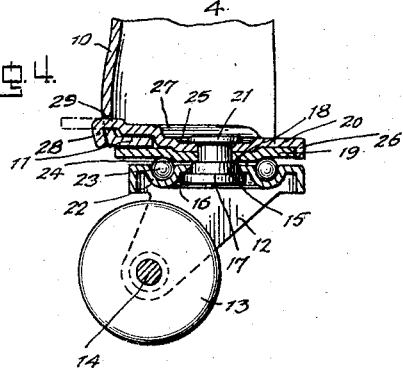
Fig. 4 is a vertical sectional view taken along the line 4—4 of Fig. 2.

A slot 29 is cut in the corner of the leg 10 slightly above the flange 11 and is adapted in assembling the caster to the leg to be engaged by the tongue 28. As shown in Fig. 1 the caster is assembled by sliding the same upon the flanges 11, which snugly engage the peripheral V-shaped recess as clearly shown in Figs. 2 to 4, the tongue 28 engaging the slot 29 and being thereupon bent downwardly to retain the caster against lateral movement. It will be observed that the caster is securely attached, irrespective of the contour of the leg above the flange, and that the extent of the peripheral recess is such that the caster may be attached to legs in which the flange varies in width and angularity within relatively large limits.

Figure 5:
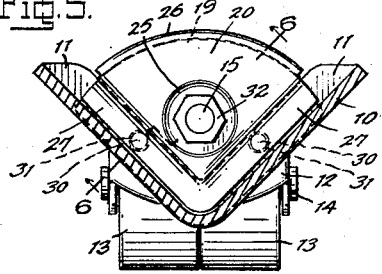
Fig. 5 is a plan view, similar to Fig. 3 and showing a modified form of the invention.
Figure 6:
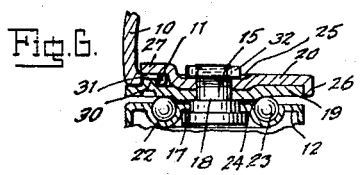
Fig. 6 is a vertical sectional view taken along line 6—6 of Fig. 6.

In Figs. 5 and 6 I have shown a modified form in which the tongue 28 is dispensed with, the caster being secured against lateral movement by studs or bosses 30 formed upon the marginal portion of the plate 19 and which engage holes 31 formed in the flanges 11. In this form the upper plate 20 is clamped down by a nut 32 screwed upon the stud 15, which is threaded at its upper end, and which permits the upper plate to be first separated sufficiently to engage the studs with the flanges.

Figure 7:
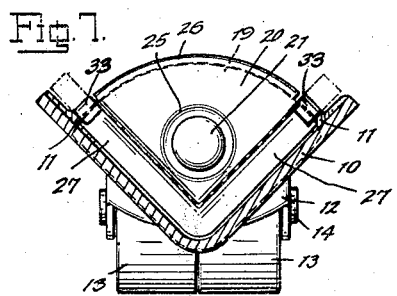
Fig. 7 is a plan view, similar to Fig. 3, showing another modified form of the invention.

In Fig. 7 I have shown a further modification in which bendable lug portions 33 are provided at the rear ends of the flanges 11 and which are bent over upon the plate 20 after the caster is engaged to retain the same against lateral movement.

I have illustrated and described preferred and satisfactory embodiments of the invention, but it will be obvious that changes may be made therein, within the spirit and scope thereof, as defined in the appended claims.

Having thus described my invention what I claim and desire to secure by Letters Patent is:—

1. A caster for attachment to an angular sheet metal, or similar leg or corner structure having inturned base flanges forming a V, comprising attaching means adapted to engage said flanges above and below and to span the sides of said V, means adapted to cooperate with the leg to retain said attaching means against lateral movement, and a floor engaging element connected to said attaching means.

2. A caster for attachment to an angular sheet metal or similar leg or corner structure having inturned base flanges forming a V, comprising attaching means including a plate adapted to engage beneath and span the sides of said V, means secured to said plate and adapted to engage the sides of said V, and a floor engaging element connected to said plate.

3. A caster for attachment to a sheet metal or similar leg or corner structure having an inturned base flange, comprising attaching means including a pair of connected plates adapted to respectively engage the flange above and below, means adapted to cooperate with the leg to retain said attaching means against lateral movement, and a floor engaging element connected to said attaching means.

4. A caster for attachment to a sheet metal or similar leg or corner structure having an inturned base flange, comprising attaching means adapted to engage the flange above and below, means integral with said attaching means adapted to cooperate with the leg to retain said attaching means against lateral movement, and a floor engaging element connected to said attaching means.

5. A caster for attachment to a sheet metal or similar leg or corner structure having an inturned base flange, comprising attaching means adapted to engage the flange above and below, means integral with the leg adapted to cooperate with said attaching means to retain the same against lateral movement, and a floor engaging element connected to said attaching means.

Signed at Bridgeport, county of Fairfield, and State of Connecticut, this 24th day of October, 1930.

WALTER F. HEROLD.